United States Patent
Lautenbacher et al.

(10) Patent No.: US 12,027,054 B2
(45) Date of Patent: Jul. 2, 2024

(54) COMMUNICATION SYSTEM AND METHOD OF CONTROLLING AIR TRAFFIC OF AN AIRSPACE

(71) Applicant: Rohde & Schwarz GmbH & Co. KG, Munich (DE)

(72) Inventors: Markus Lautenbacher, Munich (DE); Jörg Kilpert, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 238 days.

(21) Appl. No.: 17/212,213

(22) Filed: Mar. 25, 2021

(65) Prior Publication Data

US 2021/0343155 A1    Nov. 4, 2021

(30) Foreign Application Priority Data

Apr. 29, 2020 (EP) .................................... 20172061

(51) Int. Cl.
*G08G 5/00* (2006.01)
*G08G 5/06* (2006.01)
(Continued)

(52) U.S. Cl.
CPC ............. *G08G 5/0013* (2013.01); *G08G 5/06* (2013.01); *H04L 67/10* (2013.01); *H04W 72/0453* (2013.01); *H04W 72/54* (2023.01)

(58) Field of Classification Search
CPC ........ G08G 5/0013; G08G 5/06; H04L 67/10; H04L 67/12; H04L 67/125; H04W 72/0453; H04W 72/54
See application file for complete search history.

(56) References Cited

U.S. PATENT DOCUMENTS 8,055,704 B2 * 11/2011 Benco ................ B64D 11/0015
                                                  709/203
8,073,443 B2 * 12/2011 Wahler ..................... H01Q 1/32
                                                  455/430
(Continued)

FOREIGN PATENT DOCUMENTS

CN    209103548 U   *   7/2019
CN    113924608 A   *   1/2022   ........... G08G 5/0013
(Continued)

OTHER PUBLICATIONS

Eier at al., Cloud based services in air traffic management, 2012 Integrated Communications, Navigation and Surveillance Conference, 2012, pp. G5-1-G5-9, doi: 10.1109/ICNSurv.2012.6218402 (Year: 2012).*

(Continued)

*Primary Examiner* — Eric Nowlin
(74) *Attorney, Agent, or Firm* — CHRISTENSEN O'CONNOR JOHNSON KINDNESS PLLC

(57) ABSTRACT

A communication system for air traffic control is described. The communication system includes a cloud based server structure, at least one controller working position as well as at least one radio ground station for transmitting radio signals to an aircraft and/or receiving radio signals from an aircraft. The at least one radio ground station and the at least one controller working position are connected to the cloud based server structure by means of an internet protocol infrastructure. The cloud based server structure is configured to process signals for air-ground communication and/or ground-ground communication. Furthermore, a method of controlling air traffic of an airspace is described.

17 Claims, 1 Drawing Sheet

(51) Int. Cl.
*H04L 67/10* (2022.01)
*H04W 72/0453* (2023.01)
*H04W 72/54* (2023.01)

(56) References Cited

U.S. PATENT DOCUMENTS

| | | | | |
|---|---|---|---|---|
| 8,340,663 | B2* | 12/2012 | Tieftrunk | H04B 7/18506 455/430 |
| 8,717,169 | B2* | 5/2014 | Rodger | G08B 21/06 701/120 |
| 9,281,890 | B2* | 3/2016 | Apostolakos | H04B 7/18508 |
| 9,426,768 | B1* | 8/2016 | Small | H04W 64/00 |
| 9,620,024 | B1* | 4/2017 | Mottram | G08G 5/0091 |
| 9,692,500 | B2* | 6/2017 | Small | H04B 7/18506 |
| 9,858,798 | B2* | 1/2018 | Ellsworth | G08B 25/00 |
| 9,886,862 | B1* | 2/2018 | Burgess | G06F 3/167 |
| 9,918,192 | B2* | 3/2018 | Rodriguez Montejano | H04L 43/16 |
| 10,186,158 | B2* | 1/2019 | Burgess | G08G 5/0008 |
| 10,243,646 | B2* | 3/2019 | Zeng | H04L 45/245 |
| 10,453,347 | B2* | 10/2019 | Winkler | H04W 4/024 |
| 10,593,219 | B2* | 3/2020 | Burgess | H04W 4/40 |
| 10,621,874 | B2* | 4/2020 | Vieten | G08G 5/0013 |
| 11,495,221 | B2* | 11/2022 | Takacs | B64C 39/024 |
| 11,527,165 | B2* | 12/2022 | Sprengart | G07C 5/0841 |
| 2009/0187640 | A1* | 7/2009 | Delia | G06Q 10/00 709/219 |
| 2009/0197596 | A1* | 8/2009 | Wahler | H01Q 1/28 455/431 |
| 2010/0281100 | A1* | 11/2010 | Benco | H04L 69/26 709/201 |
| 2011/0231525 | A1 | 9/2011 | Balani et al. | |
| 2011/0292907 | A1* | 12/2011 | Tieftrunk | H04B 7/18506 701/3 |
| 2012/0306649 | A1* | 12/2012 | Rodger | G08B 21/06 340/540 |
| 2014/0334405 | A1* | 11/2014 | Chen | H04W 16/24 370/329 |
| 2015/0180567 | A1* | 6/2015 | Apostolakos | H04L 65/1069 370/316 |
| 2016/0014108 | A1* | 1/2016 | Chen | H04L 67/10 726/4 |
| 2016/0246297 | A1* | 8/2016 | Song | B64C 39/024 |
| 2016/0309291 | A1* | 10/2016 | Rodriguez Montejano | H04W 4/06 |
| 2016/0365917 | A1* | 12/2016 | Small | H04W 64/00 |
| 2018/0061243 | A1* | 3/2018 | Shloosh | B64D 45/0005 |
| 2018/0182251 | A1* | 6/2018 | Burgess | G06F 3/167 |
| 2018/0199357 | A1* | 7/2018 | Sundararaj | G08G 5/0013 |
| 2018/0315323 | A1* | 11/2018 | Winkler | H04L 67/12 |
| 2018/0352027 | A1* | 12/2018 | Sharma | H04L 67/12 |
| 2018/0366009 | A1* | 12/2018 | Vieten | G08G 5/0013 |
| 2019/0130771 | A1 | 5/2019 | Burgess et al. | |
| 2019/0304312 | A1* | 10/2019 | Rakes | G08G 5/0052 |
| 2019/0335022 | A1* | 10/2019 | Pasam | H04L 67/147 |
| 2020/0092731 | A1* | 3/2020 | Beck | H04W 72/56 |
| 2020/0226940 | A1* | 7/2020 | Srinivasan | G08G 5/0078 |
| 2021/0065561 | A1* | 3/2021 | Sprengart | G07C 5/0816 |
| 2021/0159971 | A1* | 5/2021 | Panchal | H04B 7/1855 |
| 2021/0225371 | A1* | 7/2021 | Takacs | G08G 5/0052 |
| 2021/0343155 | A1* | 11/2021 | Lautenbacher | H04L 67/12 |
| 2021/0360608 | A1* | 11/2021 | Chakraborty | H04W 64/00 |
| 2022/0208011 | A1* | 6/2022 | Holmes | G08G 5/0039 |
| 2022/0215765 | A1* | 7/2022 | Gupta | G08G 5/006 |

FOREIGN PATENT DOCUMENTS

| | | | | |
|---|---|---|---|---|
| EP | 3680832 | A1 * | 7/2020 | G08G 5/003 |
| EP | 3542354 | B1 * | 1/2021 | G08G 5/0013 |
| WO | WO-2018091607 | A1 * | 5/2018 | G08G 5/0013 |
| WO | WO-2020006161 | A1 * | 1/2020 | G06F 21/6254 |
| WO | WO-2020219552 | A1 * | 10/2020 | G08G 5/0013 |

OTHER PUBLICATIONS

Cordero Garcia, Jose & Uclés, Natalia & Pablo, José & Dorado, Manuel. (2013). Automated Speech Recognition in Controller Communications applied to Workload Measurement. (Year: 2013).*

Kampichler et al., Distributed MILS: A novel approach to advanced ATM communication services, Apr. 22, 2013, 2013 Integrated Communications, Navigation and Surveillance Conference (ICNS), Herndon, VA, USA, 2013, pp. 1-8, doi: 10.1109/ICNSurv.2013.6548569 (Year: 2013).*

Kampichler et al., A D-MILS console subsystem for advanced ATM communication services, Oct. 5, 2014, 2014 IEEE/AIAA 33rd Digital Avionics Systems Conference (DASC), Colorado Springs, CO, USA, 2014, pp. 6D2-1-6D2-8, doi: 10.1109/DASC.2014.6979505 (Year: 2014).*

Kampichler et al., An adaptive MILS Architecture for Resilient Remote Tower Communication Services, Sep. 8, 2019, 2019 IEEE/AIAA 38th Digital Avionics Systems Conference (DASC), San Diego, CA, USA, 2019, pp. 1-7, doi: 10.1109/DASC43569.2019.9081732 (Year: 2019).*

Lautenbacher, M., "Innovative cloud architecture for air traffic control," News 213(15):55-59, Aug. 13, 2015, 6 pages.

Wikipedia: "Thin clients connected to their server via a computer network", Mar. 7, 2020, pp. 1-7.

* cited by examiner

COMMUNICATION SYSTEM AND METHOD OF CONTROLLING AIR TRAFFIC OF AN AIRSPACE

FIELD OF THE DISCLOSURE

Embodiments of the present disclosure generally relate to a communication system for air traffic control. Further, embodiments of the present disclosure relate to a method of controlling air traffic of an airspace.

BACKGROUND

Air traffic control (ATC) of a respective airspace is typically done by air navigation service providers (ANSPs) that are public or private legal entities which provide a respective air navigation service. For instance, air traffic management (ATM) is one of the services that are provided by the air navigation service providers. The air traffic management is associated with at least one controller working position (CWPs) that may be located in a tower of an airport. The air traffic controller working at the controller working position receives certain information concerning the airspace to be controlled which is used to control the air traffic of the respective airspace appropriately.

For air traffic control, each controller working position typically comprises a computer having an operation system that processes the information provided by the air traffic management individually. Therefore, the costs are very high for establishing several controller working positions at different locations, for instance at different towers at different airports.

Furthermore, information between different air navigation service providers, which may monitor different portions of a national airspace, cannot be exchanged easily among each other.

Accordingly, there is a need for a cost-efficient and simple way to provide air traffic control of an airspace.

SUMMARY

The present disclosure provides examples of a communication system for air traffic control. In an embodiment, the communication system comprises a cloud-based server structure, at least one controller working position as well as at least one radio ground station for transmitting radio signals to an aircraft and/or receiving radio signals from an aircraft. The at least one radio ground station and the at least one controller working position are connected to the cloud based server structure by an Internet Protocol (IP) infrastructure. The cloud-based server structure is configured to process signals for air-ground communication and/or ground-to-ground communication.

The present disclosure also provides examples of a method of controlling air traffic of an airspace. In an embodiment, the method comprises the steps of:
receiving a radio signal by at least one radio ground station that is connected with a cloud based server structure via an internet protocol (IP) infrastructure;
forwarding information associated with the radio signal received to the cloud based server structure via the internet protocol (IP) infrastructure;
processing the information associated with the radio signal received by the cloud based server structure;
forwarding the information associated with the radio signal received to at least one controller working position (CWP) that is connected with the cloud based server structure via the internet protocol (IP) infrastructure; and
providing the information associated with the radio signal received at the controller working position.

In other embodiments, the method comprises the steps of:
receiving information inputted by at least one controller working position that is connected with a cloud based server structure via an internet protocol (IP) infrastructure;
forwarding the information inputted to the cloud based server structure via the internet protocol (IP) infrastructure;
processing the information inputted by the cloud based server structure;
forwarding the information inputted to at least one radio ground station that is connected with the cloud based server structure via the internet protocol (IP) infrastructure; and
transmitting a radio signal associated with the information inputted via the at least one radio ground station.

The main idea is based on the finding that the entire air traffic control (ATC) can be simplified in a cost-efficient manner by providing the cloud-based server structure that communicates with the at least one controller working position as well as the at least one radio ground station via the respective IP infrastructure. The cloud-based server structure provides applications, also called programs, scripts, etc., which are typically used by air traffic controllers at their controller working positions. Put differently, the respective applications run on the cloud-based server structure such that the controller working position may comprise output devices that output the respective information provided by the cloud-based server structure, for example the applications running on the cloud-based server structure. Therefore, it is not necessary that each controller working position is equipped with expensive hardware in order to provide the necessary computational power that is required for running the applications. In addition, the same applications can be used at different locations, for example controller working positions at different locations, by simply connecting to the cloud-based server structure via the IP infrastructure.

In some embodiments, the IP infrastructure may relate to a wide area network (WAN).

Generally, the cloud-based server structure concerns a data center that comprises circuitry (e.g., hardware (components) and/or software (components). The respective cloud-based server structure may relate to a central server structure or rather a distributed server structure with several distributed circuitry components that are connected with each other by the IP infrastructure. The different circuitry components distributed may be connected to the same IP network, namely the wide area network.

However, the circuitry of the cloud-based server structure is located at a different location compared to the respective controller working position. In some embodiments, the circuitry of the cloud-based server structure is located at a different location compared to any controller working position connected via the internet protocol infrastructure.

Since the respective applications (as well as data associated therewith) is provided by the cloud-based server structure, different entities having access to the cloud-based server structure can use them. Accordingly, the associated costs can be shared between the participating entities appropriately.

For instance, several air navigation service providers may use a common cloud-based server structure.

Generally, the cloud based server structure may be provided by at least one air navigation service provider, for example several air navigation service providers together. Alternatively, the cloud based server structure, namely the respective circuitry, is provided by a service provider different to an air navigation service provider, for instance an external service provider. Then, the air navigation service provider(s) may purchase the respective service. Accordingly, the at least one air navigation service provider does not have any maintenance costs for the respective hardware components.

The radio ground station is equipped with at least one radio for radio transmission (transmitter) and/or at least one radio for radio reception (receiver). In some embodiments, one radio ground station may comprise several radios, such as several transmitters, receivers, and/or transceivers. Moreover, the radio ground station may comprise at least one main radio and a standby radio that can be used in case of a failure or an occupancy of the main radio.

In general, the at least one radio is an IP-based radio that is connected to the cloud-based server structure by the internet protocol (IP) infrastructure. In some embodiments, the transmitter and/or the receiver have their own IP addresses.

As mentioned above, the at least one controller working position is connected with the cloud-based server structure that provides the respective functionality required at the controller working position. Thus, the respective functionality may be provided at a different location compared with the location of the controller working position itself.

The cloud-based server structure is configured to process signals for air-ground communication and/or ground-ground communication. Accordingly, the cloud-based server structure may provide functionalities such as best signal selection (between several radios), switching between a main radio and a standby radio, call forwarding, conference and so on.

In addition, the cloud-based server structure may also provide further functionalities such as configuration of the entire communication system and/or monitoring of the communication system, for example its respective components.

An aspect provides that the cloud-based server structure is configured to forward signals, for example voice signals, received from the at least one radio ground station to the at least one controller working position via the Internet Protocol infrastructure. Alternatively or additionally, the cloud-based server structure is configured to forward signals, for example voice signals, received from the at least one controller working position to the at least one radio ground station via the Internet Protocol infrastructure. The communication between the controller working position and the radio ground station is established via the cloud-based server structure. In some embodiments, data signals, voice signals or any other signals associated with information are exchanged via the cloud-based server structure that is connected to the radio ground station and the controller working position via the IP infrastructure.

According to another aspect, the communication system comprises at least one voice communication system (VCS) and at least one air traffic management (ATM) system which are associated with the controller working position. In some embodiments, the at least one voice communication system, the at least one air traffic management system and the at least one controller working position are interconnected with each other via the Internet Protocol infrastructure. The voice communication system relates to an IP-based voice communication system that enables radio communication between air traffic controllers at their controller working positions and pilots, including specific radio remote control operations if required. The voice communication system may also enable ground-to-ground communications. Furthermore, the voice communication system provides additional voice services such as intercom, telephony and so on.

The voice communication system (VCS) and the air traffic management (ATM) system may be provided by the cloud based server structure, for example the respective functionalities of these systems.

Another aspect provides that the cloud-based server structure is configured to process at least one radio scenario, for example an air-ground communication scenario and/or a ground-ground communication scenario, which is selected via the at least one controller working position. Hence, the air traffic controller is enabled to select a certain radio scenario via its controller working position. The respective selection is forwarded to the cloud-based server structure via the IP infrastructure wherein the selection is processed by the cloud-based server structure such that the respective radio scenario selected is enabled appropriately. Accordingly, the controller working position does not have any means for processing the selection done by the air traffic controller since the selection is only forwarded to the cloud-based server structure for being processed by the cloud-based server structure.

Furthermore, the communication system may be configured to provide information via the controller working position to an air traffic controller, wherein the information is obtained via the radio ground station. In some embodiments, the information obtained is displayed via the controller working position, for example a display provided by the controller working position. Hence, the air traffic controller is informed appropriately by the controller working position wherein the respective information is forwarded to the controller working position via the IP infrastructure. The radio ground station may receive a radio signal encompassing the information that is forwarded via the IP infrastructure to the cloud-based server structure, which in turn forwards the respective information to the controller working position in order to inform the air traffic controller appropriately.

Another aspect provides that the at least one controller working position has at least one device without an operating system, for instance a display, a touchscreen (touch-sensitive display), a processing circuit configured for air traffic control and/or at least one audio accessory. In some embodiments, the audio accessory is a microphone, a loudspeaker and/or a headset. Furthermore, the at least one audio accessory may be a wireless one. Therefore, the controller working position may only comprise components without an operating system, also called non-OS devices.

Accordingly, the components of the controller working position are used to output information received from the cloud-based server structure via the IP infrastructure. The respective processing of the information received via the radio ground station and the appropriate conversion of the information are done by the cloud-based server structure.

Hence, the cloud-based server structure provides at least one (virtual) device associated with an operating system (OS). Accordingly, the processing of the respective information is done on the cloud-based server structure such that it is not required to establish the controller working position with expensive hardware (components) having an operating system.

The respective non-OS device, which is connected to the cloud based server structure via the IP infrastructure in a signal-transmitting manner, can thus provide a kind of "remote access" to the cloud based server structure, for example a virtual device provided. This can be ensured since both the control and the reaction to the control, namely the transmitted data, for instance video and/or image data, is performed via the IP infrastructure, for example by an Ethernet connection.

The cloud based server structure and the respective non-OS device are arranged in or integrated into a common network, for example a local area network (LAN) or a wide area network (WAN). In principle, however, the cloud based server structure and the non-OS device can be located in different rooms, as they can communicate with each other via the IP infrastructure.

The non-OS devices assigned to the cloud based server structure can be radios, telephones, video cameras or other devices from which corresponding data is to be transmitted via the cloud based server structure to the non-OS device.

The data received, for example the data requested by the non-OS device(s), can then be output at the non-OS device in such a way that the air traffic controller is aware of it.

The cloud based server structure may forward a received control command via one of the non-OS devices to another component, for instance another non-OS device, while requesting the corresponding data. In other words, the cloud based server structure forwards the control command(s) to the appropriate device(s).

The non-OS device is configured to process different data content assigned to different controller working positions. In this respect, it is possible that non-OS device may receive the video and/or image data that are actually intended for two different control working positions.

The non-OS device receiving the different data contents, for example two different video streams, can forward them to different display units assigned to the non-OS device. The display units can each be assigned to a specific control working position.

It may also be provided that two different data contents are displayed on a single display unit, for example in two different areas of the display unit. The display can thus be divided into at least two separate areas in which different data contents are displayed, for example a lower area and an upper area of the display shown on the display unit, for instance a touchscreen. This can also be referred to as a "split screen". This enables an air traffic controller to monitor two different areas via one display.

In principle, the different data contents may originate from two different components of the communication system that are connected to the non-OS device via the IP infrastructure.

In addition, it may be provided that the non-OS device receives at least two data sets, for example two video streams. In some embodiments, the data sets have the same data content.

Basically, redundancy can be ensured if several data sets are transmitted to the non-OS device, which are then outputted by the non-OS device. The first data set and the second data set can be designated as main data set ("main") or redundant data set ("standby"). The second data set can provide the same information as the first data set, especially if the first data set is faulty or fails.

In addition, an access point may be provided that is associated with the at least one controller working position, wherein the access point is connected with the cloud-based server structure by the Internet Protocol infrastructure. In some embodiments, the access point is configured to forward signals from the controller working position to the cloud-based server structure for being processed by the cloud-based server structure. In some embodiments, the access point may relate to a one point interface via which several controller working positions assigned to a respective control center are connected with the IP infrastructure and the cloud-based server structure associated therewith. In some embodiments, the components or devices of the respective controller working position(s) are connected with the access point in a wireless manner Put differently, the access point may be used to connect wireless components and/or devices of the at least one controller working position with the IP infrastructure in an easy and efficient manner.

Another aspect provides that the cloud-based server structure is connected with at least two air navigation service providers (ANSPs). In some embodiments, the at least two ANSPs are connected with the cloud-based server structure by the Internet Protocol infrastructure. Thus, two different ANSPs may share the cloud-based server structure, namely the respective hardware (components), wherein information between both ANSPs can be exchanged easily. The ANSPs may each have at least one controller working position, for example a respective control center comprising several controller working positions.

Generally, the at least one radio ground station may be configured to communicate with a radio having a voice over internet protocol identification (VoIP identification), wherein information associated with the voice over internet protocol identification is forwarded to the controller working position. In some embodiments, a selection circuit or module is provided via which an air traffic controller is enabled to select a certain radio within the airspace. The respective selection is based on the voice over internet protocol identification received. Put differently, the air traffic controller obtains the respective information concerning the radios within the airspace to be controlled by the VoIP identification received, wherein the controller can easily select one of different radios, namely different aircrafts, in order to establish a respective communication via the radio ground station with the selected radio.

Moreover, the selection module may be used to select a respective radio scenario, namely ground-ground communication and/or ground-air communication.

Thus, the selection module is configured to communicate with the cloud based server structure in order to submit the radio scenario selected, which is performed by the cloud based server structure such that the respective radio scenario selected is enabled appropriately.

In some embodiments, voice over Internet Protocol (VoIP) technology and mechanism are used to provide the respective communication of the communication system. The VoIP technology generally ensures individual addressing of a radio on an aircraft due to an identification provided by the respective radio. The VoIP identification used by the radio ensures an unambiguous identification of the respective radio.

For instance, the VoIP identification is provided by an IPv6 address and/or a session initiation protocol uniform resource identifier (SIP URI).

The voice over Internet Protocol technology may relate to a telecommunication standard like Long Term Evolution (LTE), 5G or 5G NR (New Radio).

Accordingly, a communication system for air traffic control of an airspace is provided. The communication system may comprise at least one voice communication system (VCS), at least one air traffic management (ATM) system and at least one radio ground station that is configured to communicate with a radio having a voice over internet protocol (VoIP) identification. The radio ground station may have an internet protocol (IP) interface via which the radio ground station is connected with the voice communication system. The voice communication system and the air traffic management system may be interconnected with each other, for instance by the IP infrastructure. As mentioned above, a display, for instance a touchscreen, is provided that is configured to display information obtained via the radio ground station. The controller working position may comprise the display. The air traffic management (ATM) system may provide information to be displayed.

In general, the communication system may also comprise the radio that has the voice over internet protocol identification. For instance, the radio is on an aircraft within the airspace to be controlled by the air traffic control.

According to an aspect, the information obtained corresponds to information concerning the at least one radio within the airspace, wherein the radio has the voice over internet protocol identification. In some embodiments, the voice communication system is configured to gather the voice over internet protocol identification from the radio. In other words, the information received corresponds to information concerning the radio within the airspace. For instance, a representation of the VoIP identification is displayed on the display. In some embodiments, the information is received by the radio ground station, processed by the cloud based server structure and displayed by the controller working position, for example a display provided by the controller working position, when the radio enters (or is located in) the airspace. Accordingly, the information is received when the aircraft with the radio on board is entering (or is already located in) the airspace that is controlled.

Generally, an air traffic controller using the communication system receives the respective information of the aircraft within the airspace monitored, namely via the display in an optical manner. In some embodiments, the air traffic controller is informed about any aircraft having a respective radio with VoIP identification that enters the airspace or is located in the airspace.

The information displayed on the display may relate to the respective VoIP identification that is received via the voice communication system that is interconnected with the air traffic management system in a signal-transmitting manner. The VoIP identification or a representative thereof is displayed as soon as the radio, namely the aircraft with the radio rather the aircraft with the radio, enters the airspace monitored.

As mentioned above, a selection module may be provided by the controller working position via which the air traffic controller is enabled to select a certain radio within the airspace. The air traffic controller may select a respective radio in order to establish a VoIP communication with the respective radio via the voice communication system (and the at last one radio ground station). The selection module may relate to an electronic flight progress strip system.

For instance, the display is a touch-sensitive display (touchscreen) which provides the selection module simultaneously. The air traffic controller is enabled to interact with the touchscreen in order to select the respective radio. The radio may be labeled by its VoIP identification or a representative thereof on the display/touchscreen. Hence, the air traffic controller has a unique and unambiguous representation for the respective radio, for example the aircraft comprising the respective radio.

Further, the voice communication system may be configured to automatically set up a voice over internet protocol connection with a radio selected via the selection module. In some embodiments, the voice over internet protocol connection is accepted automatically by the respective radio selected. Accordingly, the communication system automatically establishes the VoIP connection with the radio, namely the radio on the aircraft. By selecting the respective radio or rather aircraft comprising the radio via the selection module, for example the touch-sensitive display, the VoIP connection is set up and automatically accepted by the radio in the aircraft.

In some embodiments, a radio is selected by the controller wherein the radio ground station shall establish the VoIP connection with the radio selected. The VoIP connection is established automatically since the VoIP connection is set up automatically when selecting the respective radio and the VoIP connection is accepted automatically by the radio, resulting in the automatically established VoIP connection. Put differently, the VoIP connection with the radio selected is set up automatically, wherein the VoIP connection set up is automatically accepted by the radio selected. Therefore, the VoIP connection is established automatically once the air traffic controller has selected the radio on the display.

Once the VoIP connection is established, the controller can speak with a pilot of the aircraft having the radio and vice versa. For this purpose, the (wireless) audio accessory may be used. The audio accessory may be connected with the access point in order to be connected to the IP infrastructure.

Several radio ground stations and/or several radios may be provided that are each configured to communicate with a radio having the voice over internet protocol identification. Depending on the respective position of the radio, namely the aircraft having the radio, a certain radio ground station or rather radio of the communication system is used for establishing the VoIP connection. This is also called best signal selection. The respective selection may be performed by the cloud based server structure that is connected with the several radio ground stations and/or radios.

In some embodiments, the air traffic management system is configured to exchange an exact position of the radio in the airspace with the voice communication system, wherein the voice communication system is configured to route a voice over internet protocol connection established to one of the several radio ground stations which provides best communication properties. Hence, the one of the several radio ground stations which provides the best receive/transmission properties (best signal selection) is selected in order to maintain the VoIP connection with the radio. This might happen several times within a respective area of the airspace or rather the entire airspace such that the VoIP connection is maintained while ensuring best communication properties.

As the VoIP connection is maintained among these several radio ground stations, the same controller is responsible for the aircraft with the radio irrespective of any sector. Accordingly, a sectorless flying is implemented within the entire airspace.

Generally, the voice communication system may select the one of the several radio ground stations which provides the best receive/transmission properties in order to establish the VoIP connection with the radio due to the exact position of the radio when setting up the VoIP connection.

In some embodiments, the communication system may be configured to perform an automatic handover scenario of a voice over internet protocol connection established. The handover scenario relates to maintaining the VoIP connection while selecting another radio ground station of the several radio ground stations for communicating with the respective radio. In some embodiments, the radio ground station providing the best communication properties is selected when performing the automatic handover scenario.

In other words, an exact position of the radio in the airspace may be exchanged with the voice communication system, wherein the voice communication system routes the VoIP connection established to one of the several radio ground stations which provides best communication properties.

Generally, the automatic handover scenario enables a continuous communication between the (same) controller and the aircraft having the radio, for example the pilot of the aircraft.

The automatic handover scenario of the voice over internet protocol connection established may be performed among several radio ground stations when the radio is moving. The radio may be located on the aircraft that moves within the airspace. Hence, the respective distance from the radio to one of the several radio ground stations may change while the aircraft moves, namely the radio on board (airborne radio), such that the respective communication properties vary. The automatic handover scenario is performed in order to ensure best communication properties between the radio and the radio ground stations, namely a certain one having the best communication properties with respect to the actual position of the radio within the airspace.

The automatic handover scenario may take place within the entire airspace monitored by a single air navigation service provider (ANSP), for instance a national airspace. Hence, the VoIP connection with the single controller is maintained due to the automatic handover scenario, for example the controller responsible for the entire airspace.

Alternatively, the airspace automatic handover scenario may take place within an airspace monitored by several air navigation service providers (ANSPs), for instance several national airspaces. Accordingly, the VoIP connection is handed over from a first controller responsible of a first (national) airspace to a second controller responsible of a second (national) airspace.

An aspect provides that the voice communication system is connected with a wide area network (WAN). For instance, the several ground stations are connected with the white area network. The wide area network ensures that the VoIP connection established can be routed from one radio ground station to another radio ground station while maintaining the respective VoIP connection. The different radio ground stations may be located over a large distance, for example an area monitored by a respective air navigation service provider (ANSP), wherein maintaining of the VoIP connection is ensured by the wide area network connected with the voice communication system.

The wide area network may be associated with a single national airspace or with several airspaces.

In general, a wide area network (WAN) is a telecommunications network that extends over a large geographical area for the primary purpose of computer networking. The wide area network (WAN) ensures that data or information can be distributed across the large geographical area.

In contrast to the wide area network (WAN), similar types of networks like personal area networks (PANs), local area networks (LANs), campus area networks (CANs), or metropolitan area networks (MANs) are usually limited to a room, building, campus or specific metropolitan area, respectively.

Typically, a personal area network (PAN), a local area network (LAN), a campus area network (CAN), or a metropolitan area network may be connected with a wide area network (WAN).

In some embodiments, a wide area network (WAN) relates to computer networking technologies used to transmit data or information over long distances, and between different LANs, MANs and other localized computer networking architectures. Hence, WANs are used to connect LANs and other types of networks together so that users and computers in one location can communicate with users and computers in other locations. Many WANs are built for one particular organization and are private. Others, built by Internet service providers, provide connections from an organization's LAN to the Internet.

In general, a so-called voice communication system (VCS) in the cloud can be provided by the wide area network that is connected to the voice communication system (VCS).

The voice communication system in the cloud can be used to provide a geographic redundancy, namely a redundancy distributed over a large geographic area, for example a geographic area covered by the WAN.

Another aspect provides that the air traffic management system comprises a radar system and a flight management system, wherein the radar system is configured to obtain identification information of an aircraft in the airspace which has the radio with the voice over internet protocol identification and to forward this identification information to the flight management system. The flight management system may be configured to obtain position information of the aircraft in the airspace and the voice over internet protocol identification of the radio. The identification information of the aircraft may relate to radar information obtained, for instance by a transponder on the aircraft. Accordingly, the radar system may relate to a secondary surveillance radar that is used to exchange data for identification purposes.

The flight management system may be associated with the voice communication system. For instance, the flight management system comprises the voice communication system at least partly. In some embodiments, the flight management system is configured to obtain/process the VoIP identification of the radio wherein which the voice communication system may communicate via the voice over internet protocol connection.

Another aspect provides that the communication system is configured to provide a redundant frequency channel system for radio transmission and/or radio reception, wherein the communication system has several main frequency channels and further standby frequency channels which together establish the redundant frequency channel system. Thus, a communication is ensured by the communication system even though a certain failure may occur that blocks one of the main frequency channels used for communication purposes. In general, the respective main frequency channels may have different priorities, for instance from 1 (lowest) to 20 (highest) in case of 20 main frequency channels. Further, six standby frequency channels may be provided.

The communication system may be configured to switch over to a respective standby frequency channel in case of a failure in the main frequency channel. Alternatively or additionally, the communication system is configured to switch over to a second main frequency channel in case of a failure in a first main frequency channel and no available standby frequency channel. The second main frequency channel may have a priority that is lower than the priority of the first main frequency channel in order to avoid blocking of a frequency channel that has a higher priority. The voice communication system may comprise a voice communication management system, for example a radio remote management and control (RRMC) module, that monitors the availability of all frequency channels, for example the main frequency channels and/or the standby frequency channels. Thus, a suitable frequency channel to be switched to is identified easily in case of failure.

In some embodiments, a simplex communication is established between the respective radios associated with the at least one radio ground station and the cloud based server structure.

Generally, main radios and standby radios may be provided that can be used in case of failure of a main radio. All these radios relate to radio resources.

Parameters, for instance frequency and/or channels spacing, may be taken from an initial radio resource, namely a main radio, in case of failure which are applied to another radio, for instance a respective standby radio.

Generally, all main radios may be preconfigured and function properly wherein the main radios are configured to designated frequencies.

Another aspect provides that the cloud-based server structure is configured to provide redundancy. Accordingly, the cloud-based server structure comprising circuitry (e.g., hardware means) also provides redundancy in order to avoid a failure of the communication system due to a failure of a certain circuitry component associated with the cloud-based server structure. For instance, at least one main RRMC server as well as a backup RRMC server are provided.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In some embodiments disclosed herein, the term "module," "unit," "device," etc., refers to or includes, inter alia, a combination of hardware (e.g. a processor such as an integrated circuit or other circuitry) and software (e.g. machine- or processor-executable instructions, commands, or code such as firmware, programming, or object code). Furthermore, a combination of hardware and software may include hardware only (i.e. a hardware element with no software elements), software hosted at hardware (e.g. software that is stored at a memory and executed or interpreted at a processor), or hardware with the software hosted thereon. In some embodiments, the hardware may, inter alia, comprise a CPU, a GPU, an FPGA, an ASIC, or other types of electronic circuitry.

Figure 1:
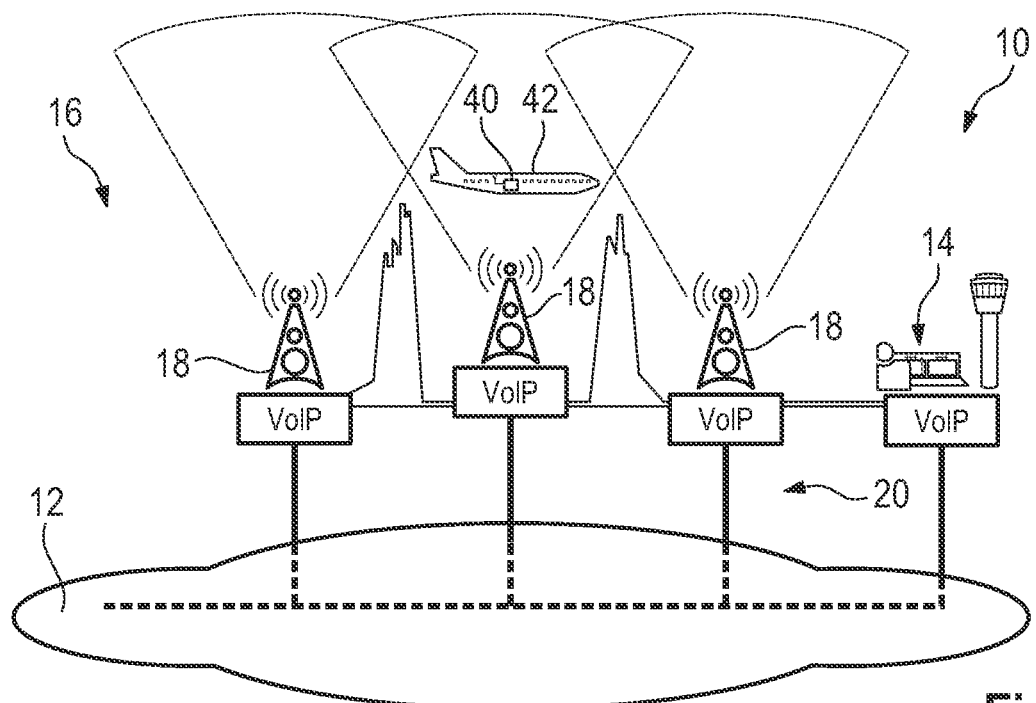
FIG. 1 schematically shows a communication system for air traffic control of an airspace according to an embodiment of the present disclosure.

FIG. 1 shows a communication system 10 for air traffic control of a certain airspace. The communication system 10 comprises a cloud-based server structure 12 that is connected to at least one controller working position 14 associated with a tower of an airport, for instance. The cloud-based server structure 12 is further connected with at least one radio ground station 16 that comprises three different radios 18 in the shown embodiment.

The respective radios 18 are IP-based radios that each comprise an Internet Protocol interface such that radio signals received and/or to be transmitted via the radios 18 are forwarded via an Internet Protocol (IP) infrastructure 20. Accordingly, the radios 18 relate to transmitter(s) and/or receiver(s) wherein each radio 18 has its own IP address. In some embodiments, the radio ground station 16 as well as the controller working position 14 are connected with the cloud-based server structure 12 via the Internet Protocol infrastructure 20. Generally, the IP infrastructure 20 may be associated with a wide area network (WAN).

Figure 2:
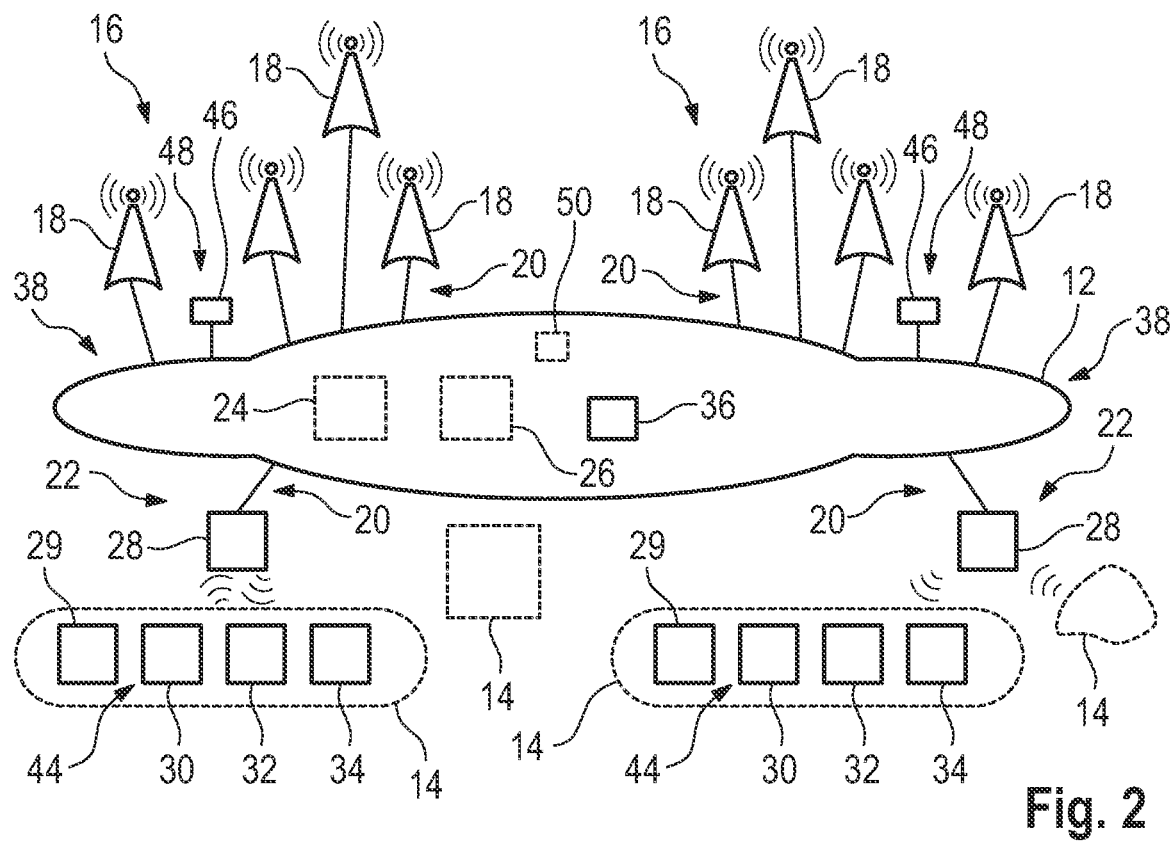
FIG. 2 shows a more detailed communication system for air traffic control of an airspace according to an embodiment of the present disclosure.

In FIG. 2, the communication system 10 is shown in a more detailed overview since two radio ground stations 16 each comprising several radios 18 are shown that are associated with a respective air traffic control center 22 with several controller working positions 14 as will be explained later in more detail.

In addition, the communication system 10 comprises at least one voice communication system 24 as well as at least one air traffic management system 26 that are associated with the cloud-based server structure 12. Accordingly, the air traffic management system 26 as well as the voice communication system 24 are connected with the respective controller working positions 14 by the IP infrastructure 20.

The communication system 10, for example each air traffic control center 22, may comprise an access point 28 via which an IP-connection is established to the cloud-based server structure 12 via the IP infrastructure 20. The access point 28 may be used to connect devices or rather components of the respective controller working position 14 in a wireless manner.

In the shown embodiment, each controller working position 14 comprises several devices and/or components, for instance a display 29, a touchscreen 30, a processing circuit or unit 32 and/or an audio accessory 34, for instance a loudspeaker, a microphone and/or a headset.

Each of these devices and/or components 29 to 34 may be established as a wireless device or rather component such that an air traffic controller is enabled to be flexible at its respective controller working position 14. All of these devices and/or components 29 to 34 may be connected with the access point 28 in a wireless manner such that the data and/or signals can be exchanged via the IP infrastructure 20.

In some embodiments, each of the devices and/or components 29 to 34 may relate to devices without operating system, namely so-called non-OS devices. Accordingly, the cloud-based server structure 12 provides the respective information while acting as a data source for the devices and/or components 29 to 34 of the controller working position 14.

For this purpose, the cloud-based server structure 12 that comprises circuitry (e.g., hardware components) may provide a virtual computer 36 having an operating system. The devices and/or components 29 to 34 associated with the controller working position 14 output the information received from the cloud-based server structure 12 via the IP infrastructure 20.

In some embodiments, the cloud-based server structure 12 processes the data and/or information while forwarding output data to the controller working position 14 such that the non-OS devices and/or components 29 to 34 of the controller working position 14 output the respective output data or rather the information associated therewith.

In other words, the cloud-based server structure 12 provides the functionality of a typical controller working position 14 since the respective signals are processed by the cloud-based server structure 12. For this purpose, the cloud-based server structure 12 provides the virtual operating system device(s) 36 that is/are assigned to the respective controller working positions 14.

In general, the respective radio ground station 16 and/or the air traffic control centers 22 are associated to a respective air navigation service provider 38. In the shown embodiment, the communication system 10 comprises the facilities of two different air navigation service providers 38, wherein the respective components, namely the radio ground stations 16 with the respective radios 18 as well as the air traffic control centers 22 are each connected to the common cloud-based server structure 12 via the IP infrastructure 20.

Therefore, the information provided by the cloud-based server structure 12 can be shared between the different air navigation service providers 38 appropriately by the IP infrastructure 20 since both air traffic control centers 22, namely the respective controller working positions 14, are connected to the same cloud-based server structure 12.

In general, each of the radio ground stations 16 is configured to communicate with an airborne radio 40 on an aircraft 42 as shown in FIG. 1 schematically. The respective airborne radio 40 may have a voice over Internet Protocol identification (VoIP ID) which is unique and unambiguous. The VoIP identification may be provided by an IPv6 address and/or a session initiation protocol uniform resource identifier (SIP URI). The VoIP identification can be exchanged between the airborne radio 40 and at least one of the radio ground stations 16, for example a receiving radio 18 (receiver).

The information obtained, namely the VoIP identification, is forwarded to the controller working position 14 via the cloud based server structure 12 and the IP infrastructure 20. In other words, the information may be processed by the cloud based server structure 12, for example the air traffic management system 26 and the voice communication system 24, such that the information, namely the VoIP identification, can be displayed on the display 29 or the touchscreen 30.

Generally, the VoIP identification itself or rather a representative thereof, namely information associated with the VoIP identification, might be displayed on the display 29. Accordingly, the information displayed may relate to information concerning the airborne radio 40 of the aircraft 42 while being in the airspace monitored.

In some embodiments, the respective information is forwarded to the controller working position 14 when the respective airborne radio 40 enters the airspace.

Therefore, the air traffic controller obtains information concerning all aircrafts 42 or rather their respective airborne radios 40 that are located in the airspace to be controlled by the air traffic controller. The airspace may relate to a national airspace that is monitored by a single air navigation service provider 38.

Furthermore, the communication system 10 may comprise a selection circuit or module 44 via which the air traffic controller is enabled to select a certain airborne radio 40 or rather aircraft 42 in the airspace in order to establish a voice over internet protocol (VoIP) connection with the respective airborne radio 40. Once the VoIP connection is established, the air traffic controller is enabled to speak with the pilot of the respective aircraft 42 having the radio 40 selected and vice versa.

In the shown embodiment, the selection module 44 is established by the touchscreen 30. Hence, the air traffic controller is able to interact with the touchscreen 30 in order to select the respective airborne radio 40 appropriately. Accordingly, the air traffic controller may select by the selection module 44 a certain radio scenario to be used for communication.

The cloud-based server structure 12 processes the radio scenario selected, for example an air-ground communication scenario and/or a ground-ground communication scenario, by controlling the radio(s) 18 in an appropriate manner and/or routing the signals/information appropriately. Hence, the air traffic controller is able to select a certain radio scenario via its controller working position 14. The respective selection is forwarded to the cloud-based server structure 12 via the IP infrastructure 20 wherein the selection is processed by the cloud-based server structure 12 such that the respective radio scenario selected is enabled.

The controller working position 14 itself does not have any means (e.g., circuitry) for processing the selection done by the air traffic controller since the selection is only forwarded to the cloud-based server structure 12 for being processed by the cloud-based server structure 12.

The communication system 10 may also comprise a radar system 46 that ensures to obtain identification information of the respective aircraft 42 in the airspace. The identification information of the aircraft 42 may relate to radar information obtained by the radar system 46, for instance by a transponder associated with the aircraft 42. Thus, the radar system 46 may relate to a secondary surveillance radar that is used to exchange data for identification purposes of the aircrafts 42 in the airspace.

The communication system 10 may further comprise a flight management system 48 that provides (exact) position information of the aircraft 42 in the airspace. The flight management system 48 may be connected with the radar system 46 in order to receive data from the radar 46 while enriching the data appropriately. The flight management system 48 may also be established by the cloud based server structure 12.

Accordingly, the communication system 10, for example the air traffic management system 12, is generally able to gather the exact position of the airborne radio 40 in the airspace, namely the aircraft 42 having the airborne radio 40, wherein the exact position of the airborne radio 40 may be exchanged with the cloud based server structure 12, for example the voice communication system 24.

In general, the VoIP technology provided ensures an individual addressing of the respective airborne radios 40 assigned to the aircrafts 42 due to the voice over internet protocol (VoIP) identification provided by the respective airborne radio 40. Accordingly, an unambiguous identification is ensured In a first step S1, information from an airborne radio 40 having the voice over internet protocol identification is received by at least one of the several radio ground stations 16, for example a respective receiving radio 18, connected with the cloud based server structure 12, for example the voice communication system 24.

In a second step S2, the information is forwarded from the cloud based server structure 12 to the controller working position 14.

In a third step S3, the information is displayed on the display 29, for example the touchscreen 30, of the controller working position 14. The information displayed may relate to the VoIP ID itself or a representative thereof which ensures a unique and unambiguous identification of the respective airborne radio 40.

Hence, the air traffic controller interacting with the control working position 14 obtains the information of all aircrafts 42 in the airspace to be monitored.

In a fourth step S4, the air traffic controller selects a respective airborne radio 40 via the selection module 44, namely the touchscreen 30. Then, the voice over internet protocol (VoIP) connection is set up automatically with the airborne radio 40 selected. In turn, the respective airborne radio 40 automatically accepts setting up the VoIP connection such that the VoIP connection is established in an entirely automatic manner. When the VoIP connection is established, the air traffic controller is enabled to speak with the pilot of the respective aircraft 42 having the airborne radio 40 selected and vice versa.

In a fifth step S5, an automatic handover scenario is performed by the communication system 10. The automatic handover scenario might be necessary to maintain the VoIP connected while the aircraft 42 is moving within the airspace.

Hence, the automatic handover scenario relates to routing the VoIP connection established to one of the several radio ground stations 16 which provides best communication properties. This might depend on the exact position of the aircraft 42, namely the airborne radio 40 associated therewith. With respect to the different radio ground stations 16.

In other words, the automatic handover scenario of the voice over internet protocol connection established can be performed by the communication system 10 while taking the exact position of the airborne radio 40 in the airspace into account.

The exact position of the airborne radio 40 may be provided by the air traffic management system 26 that exchanges the respective information with the voice communication system 24. Accordingly, the respective processing is done by the cloud based server structure 12.

The several radio ground stations 16 may generally relate to a national airspace that is controlled by a single controller. Hence, it is ensured that the same air traffic controller is responsible for the respective aircraft 42 irrespective of the position of the aircraft 42 in the airspace. Therefore, the so-called sectorless flying can be ensured appropriately.

However, the several radio ground stations 16 may also be assigned to different national airspaces such that responsibility for the respective aircraft 42 might be handed over to another controller (of another air navigation service provider) when the aircraft 42 having the airborne radio 40 leaves a first national airspace associated with the first air traffic controller while entering a second national airspace associated with a second air traffic controller.

Accordingly, the communication system 10 is enabled to provide automatic handover scenarios within a national airspace as well as between different national airspaces.

In general, the so-called sectorless flying is ensured by the communication system 10 and the method in a simple and cost-efficient manner.

Furthermore, the communication system 10, for example the cloud based server structure 12, provides a redundant frequency channel system 50 for radio transmission and/or radio reception. Accordingly, the communication system 10 has several main frequency channels and further standby frequency channels which together establish the redundant frequency channel system 50.

Therefore, a communication can be ensured by the communication system 10 even though a certain failure may occur that blocks one of the main frequency channels used for communication purposes. In general, the respective main frequency channels may have different priorities, for instance from 1 (lowest) to 20 (highest) in case of 20 main frequency channels. Further, six standby frequency channels may be provided.

In case of failure, the communication system 10, for example the cloud based server structure 12, switches over to a respective standby frequency channel in case of a failure in the main frequency channel.

Alternatively or additionally, the communication system 10 switches over to a second main frequency channel in case of a failure in a first main frequency channel and no available standby frequency channel. The second main frequency channel may have a priority that is lower than the priority of the first main frequency channel in order to avoid blocking of a frequency channel that has a higher priority.

The cloud based server structure 12, for example the voice communication system 24, may comprise a voice communication management system, for example a remote radio management and control (RRMC) circuit or module, that monitors the availability of all frequency channels, for example the main frequency channels and/or the standby frequency channels. Thus, a suitable frequency channel to be switched to can be identified easily in case of an occurring failure.

Generally, each radio base station 16 may have main radios 18 and standby radios 18 that can be used in case of failure of a respective main radio 18. All main radios 18 may be preconfigured and function properly wherein the main radios 18 are configured to operate at designated frequencies.

Parameters, for instance frequency and/or channels spacing, may be taken from an initial radio resource, namely a main radio 18, in case of failure which are applied to another radio 18, for instance a respective standby radio.

Moreover, the cloud-based server structure 12 also provides redundancy. In some embodiments, at least one main RRMC server as well as a backup RRMC server may be provided.

Certain embodiments disclosed herein, for example the respective module(s), server structure, internet protocol infrastructure, etc., utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some examples, the functionality described herein can be implemented by special purpose hardware-based computer systems or circuits, etc., or combinations of special purpose hardware-based circuits and computer instructions.

Of course, in some embodiments, two or more of these components, or parts thereof, can be integrated or share hardware and/or software, circuitry, etc. In some embodiments, these components, or parts thereof, may be grouped in a single location or distributed over a wide area. In circumstances were the components are distributed, the components are accessible to each other via communication links.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A communication system for air traffic control, comprising:
   a cloud based server structure;
   at least one controller working position including one or more devices, wherein the one or more devices includes at least one device without an operating system; and
   a plurality of radio ground stations each configured for transmitting radio signals to an aircraft or receiving radio signals from the aircraft, the aircraft having an aircraft radio with voice over internet protocol identification, wherein the plurality of radio ground stations and the at least one controller working position are connected to the cloud based server structure by an internet protocol infrastructure,
   wherein the cloud based server structure is configured to process information associated with the radio signals for air-ground communication or ground-ground communication while forwarding output data to the controller working position,
   wherein the cloud-based server structure comprises hardware that provides at least one virtual device having an operating system, wherein the cloud-based server structure provides one or more applications for use by a plurality of air traffic controllers at respective controller working positions, wherein the one or more applications run on the cloud-based server structure such that the one or more devices without the operating system output the respective output data or information associated therewith which is provided by the one or more applications running on the cloud-based server structure,
   wherein the cloud-based server structure is configured for selecting one radio ground station having the best receive or transmit properties from the plurality of radio ground stations for establishing a voice over internet protocol communication with the aircraft radio, wherein said selection by the cloud-based server structure is dependent on a respective position of the aircraft.

2. The communication system according to claim 1, wherein the cloud based server structure is configured to forward voice signals received from at least one radio ground station of the plurality of radio ground stations to the at least one controller working position via the internet protocol infrastructure or wherein the cloud based server structure is configured to forward voice signals received from the at least one controller working position to at least one radio ground station of the plurality of radio ground stations via the internet protocol infrastructure.

3. The communication system according to claim 1, wherein the communication system comprises at least one voice communication system and at least one air traffic management system which are associated with the controller working position.

4. The communication system according to claim 3, wherein the at least one voice communication system, the at least one air traffic management system and the at least one controller working position are interconnected with each other via the internet protocol infrastructure.

5. The communication system according to claim 1, wherein the cloud based server structure is configured to process at least one radio scenario, which is selected via the at least one controller working position.

6. The communication system according to claim 5, wherein the at least one radio scenario is an air-ground communication scenario and/or a ground-ground communication scenario.

7. The communication system according to claim 1, wherein the communication system is configured to provide information via the controller working position to an air traffic controller, wherein the information is obtained via at least one radio ground station of the plurality of radio ground stations.

8. The communication system according to claim 7, wherein the information obtained is displayed.

9. The communication system according to claim 1, wherein the device without an operating system is selected from a device consisting of a display, a touchscreen, a processing circuit configured for air traffic control, and at least one audio accessory.

10. The communication system according to claim 1, wherein an access point is provided that is associated with the at least one controller working position, and wherein the access point is connected with the cloud based server structure by the internet protocol infrastructure.

11. The communication system according to claim 1, wherein the cloud based server structure is connected with at least two air navigation service providers.

12. The communication system according to claim 1, wherein the plurality of radio ground stations are configured to communicate with a radio having a voice over internet protocol identification, and wherein information associated with the voice over internet protocol identification is forwarded to the controller working position.

13. The communication system according to claim 1, wherein the communication system is configured to provide a redundant frequency channel system for radio transmission and/or radio reception, and wherein the communication system has several main frequency channels and further standby frequency channels which together establish the redundant frequency channel system.

14. The communication system according to claim 13, wherein the communication system is configured to switch over to a respective standby frequency channel in case of a failure in a main frequency channel, and/or wherein the communication system is configured to switch over to a second main frequency channel in case of a failure in a first main frequency channel and no available standby frequency channel.

15. The communication system according to claim 1, wherein the cloud based server structure is configured to provide redundancy.

16. A method of controlling air traffic of an airspace, wherein the method comprises:
receiving a radio signal from an aircraft radio having a voice over internet protocol identification by at least one radio ground station of a plurality of radio ground stations that are connected with a cloud based server structure via an internet protocol infrastructure, the cloud based server structure having one or more applications that run thereon;
forwarding information associated with the radio signal received by the at least one radio ground station to the cloud based server structure via the internet protocol infrastructure;
processing, by the cloud based server, the information associated with the radio signal received by the cloud based server structure;
forwarding, by the cloud based server structure, output data including the information associated with the radio signal received to at least one controller working position that is connected with the cloud based server structure via the internet protocol infrastructure, the at least one controller working position having one or more devices;
providing the information associated with the radio signal received at the at least one controller working position, wherein the at least one controller working position comprises at least one device without operating system, wherein the cloud based server structure comprises hardware that provides a virtual computer having an operating system, wherein the one or more applications run on the cloud-based server structure such that the one or more devices without the operating system output the respective output data or information associated therewith provided by the one or more applications running on the cloud-based server structure; and
selecting, by the cloud-based server structure, one radio ground station having the best receive or transmit properties from the plurality of radio ground stations for establishing a voice over internet protocol communication with the aircraft radio, wherein said selecting, by the cloud-based server structure, is dependent on a respective position of the aircraft.

17. A method of controlling air traffic of an airspace, wherein the method comprises:
receiving information inputted by at least one controller working position, the at least one controller working position having one or more devices connected with a cloud based server structure via an internet protocol infrastructure, the cloud based server structure having one or more applications that run thereon;
forwarding the information inputted by the at least one controller working position to the cloud based server structure via the internet protocol infrastructure;
processing, by the cloud based server structure, the information inputted by the at least one controller working position;
forwarding, by the cloud based server structure, output data including the information inputted by at least one controller working position to at least one radio ground station of a plurality of radio ground stations that are connected with the cloud based server structure via the internet protocol infrastructure, wherein the plurality of radio ground stations are each configured to communicate with an aircraft radio having a voice over internet protocol identification; and
transmitting, via the at least one radio ground station, a radio signal associated with the information inputted by at least one controller working position,
wherein the at least one controller working position comprises at least one device without operating system, wherein the cloud based server structure comprises hardware that provides a virtual computer having an operating system, wherein the one or more applications run on the cloud-based server structure such that the one or more devices of the at least one controller working position without the operating system output the respective output data or information associated therewith provided by the one or more applications running on the cloud-based server structure, and
selecting, by the cloud-based server structure, one radio ground station having the best receive or transmit properties from the plurality of radio ground stations for establishing a voice over internet protocol communication with the aircraft radio, wherein said selecting, by the cloud-based server structure, is dependent on a respective position of the aircraft.

* * * * *